United States Patent [19]

Kobayashi

[11] 4,289,926
[45] Sep. 15, 1981

[54] TRANSMITTER FOR A TELEWRITER

[75] Inventor: Masahisa Kobayashi, Tokyo, Japan

[73] Assignee: Nippon Electric Co., Ltd., Tokyo, Japan

[21] Appl. No.: 131,654

[22] Filed: Mar. 19, 1980

[30] Foreign Application Priority Data

Mar. 26, 1979 [JP] Japan .................................. 54-34229

[51] Int. Cl.$^3$ ............................................. G08C 21/00
[52] U.S. Cl. .................................................... 178/19
[58] Field of Search ............................... 178/18, 19; 340/146.3 SY, 347 AD; 33/1 M; 358/257, 284

[56] References Cited

U.S. PATENT DOCUMENTS

| | | | |
|---|---|---|---|
| 3,342,935 | 9/1967 | Leifer et al. | 178/19 |
| 3,636,258 | 1/1972 | Brumbach | 178/19 |
| 3,767,858 | 10/1973 | Rodgers | 178/18 |
| 3,865,977 | 2/1975 | Hiraki et al. | 178/19 |

Primary Examiner—Thomas A. Robinson
Attorney, Agent, or Firm—Laff, Whitesel & Rockman

[57] ABSTRACT

The invention improves the signal-to-noise ratio of a telewriter transmitter without requiring a change in preexisting telewriter transmission equipment. The individual crosspoints of an orthogonal matrix of wires are identified by high-frequency X and Y signals having phase-shifted characteristics which identify individual crosspoints by phase angles. The use of high frequencies reduces coupling impedance, especially when moisture is present or humidity is high. The high frequency signals are picked up by an electrostatic coupling between the point of a pen and any selected crosspoint which the pen happens to be near. The picked-up signal is amplitude modulated to increase its strength and then fed back to the identified crosspoint, thereby enhancing the strength of the picked-up signal. The enhanced signal is again picked-up and demodulated to recover the original phase-shifted characteristics of the signal which individually identified a crosspoint selected by the pick up means. The demodulated signals are then converted into the form of crosspoint identification signal which is used by the preexisting telewriter transmission system.

7 Claims, 4 Drawing Figures

TRANSMITTER FOR A TELEWRITER

The present invention relates to a telewriter in which hand written information, at a transmitter end, is transmitted over a telephone line to a receiver, at a distant end, where it is instantaneously reproduced and recorded. More particularly, the invention relates to improvements of the transmitter for the telewriter.

A telewriter transmitter provides a signal having a phase which represents the X and Y coordinates of the position of the pen point on the writing table. As the pen point is moved to provide a handwritten character or a mark, the signal is successively given various phases, which are demodulated to reconstruct the hand-written information at the receiving end.

The position-to-phase conversion by the use of the pen point is achieved through the electrostatic coupling between the pen point and an array of wires, orthogonally arranged in parallel, both in column and line directions. The phase information of the induced voltage is converted into corresponding frequency information that is then transmitted to a receiver. The conventional telewriter as disclosed in U.S. Pat. No. 3,767,858, however, has a large coupling impedance between the writing table and the handwriting pen, resulting in a large coupling loss. For this reason, its signal to noise ratio is degraded, so that the telewriter is susceptible to external noise. A vibration of the pen results in erroneous coordinate-to-phase conversion.

The influence of moisture on the insulating member, recording sheet, and the like, laid between the matrix wires and the pen, frequently brings about a local change of the conductivity thereof. The variation in the conductivity results in the change in coupling impedance, thus leading to an incorrect reading of the coordinates on the writing table. Particularly, an environment humidity above 80 percent has an appreciable adverse effect.

Accordingly, an object of the invention is to provide a transmitter for a telewriter which is capable of correctly reading the coordinates on the table by reducing the coupling impedance between the electrode on the coordinates table and a handwriting pen. The telewriter is capable of withstanding the influence of noise and moisture.

Another object of the invention is to provide a transmitter for a telewriter capable of readily reading the coordinates on the table, merely by adding some circuits to the conventional telewriter circuits and without any change of the design of the conventional circuits.

According to the present invention, a transmitter for a telewriter has a supporting plate with an orthogonal array of parellel wires arranged on the plate, the wires extending in the X-axis direction and in the Y-axis direction, perpendicular to the X-axis direction. The arrays define X and Y coordinates on the plate. A transmission pen is adapted to provide X-axis and Y-axis signals through electrostatic coupling with the wire assembly. The signals have respective phases which are representative of the coordinates touched or nearly touched by the pen. The X-axis and Y-axis signals are translated, respectively to X-axis and Y-axis frequency signals having a predetermined frequency deviation relationship with respect to the phase of the X-axis and Y-axis signals. The X-axis and Y-axis frequency signals are used for providing at least X-axis and Y-axis phase shift signals having phase shifts lying in a preset relationship with respect to the X-axis and Y-axis frequency signals. The X-axis and Y-axis phase shift signals are equally phase-split and distributed to the wire assembly.

A source of a carrier wave has a frequency which is considerably higher than the X-axis and Y-axis frequency signal. The carrier wave is amplitude modulated respectively with the output of the phase shifting means. The signal picked up by the pen is demodulated.

The present invention uses a high frequency for the signal handled in the input and output of the writing table. The coupling impedance between the matrix wires of the writing table and the transmitting pen in inversely proportional to the frequency of the signal used. However, a mere use of the high frequency signal requires redesign of the telewriter circuits, other than the writing table. To avoid this, the present invention uses as the input signal of the writing table a high frequency signal which is modulated by the induced and properly processed signals of the pen. Thus, an adverse effect of the high frequency signal upon the other related circuits is minimized, permitting the parts of the conventional circuits to be used as they are.

The present invention will be described in detail referring to the drawings, in which.

Figure 1A:
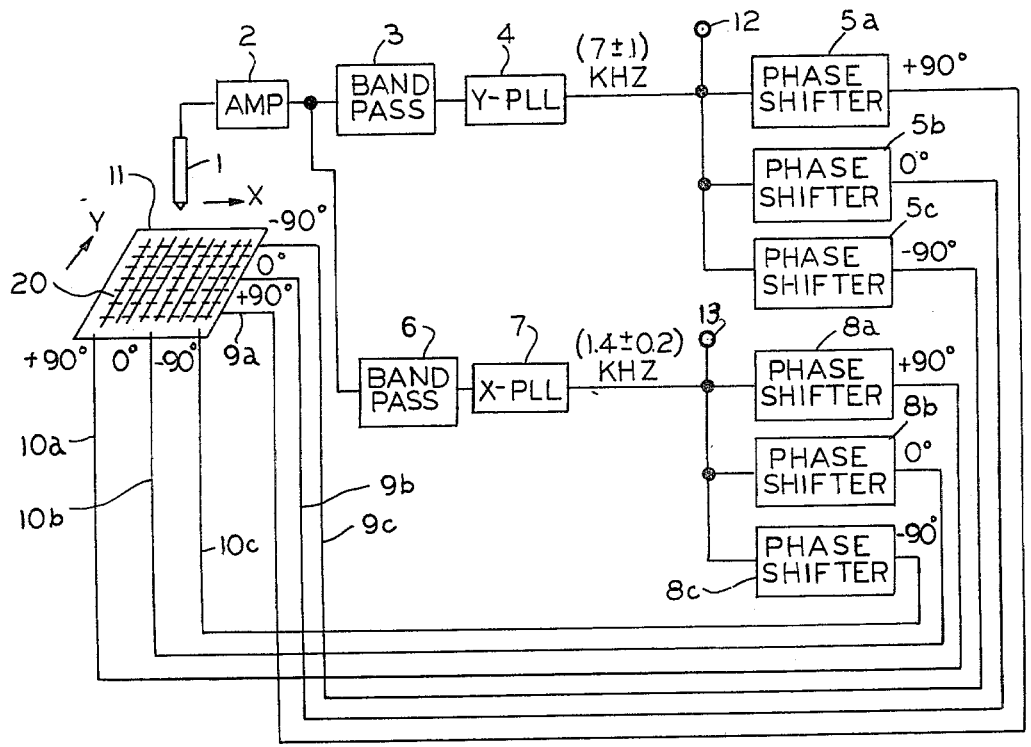
FIG. 1a is a block diagram of the substantial part of a transmitter for a conventional telewriter.
Figure 1B:
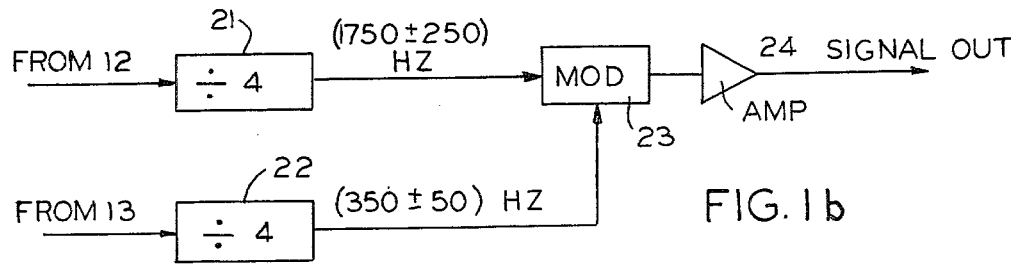
FIG. 1b is a block diagram of a modulating section for transmitting a coordinate signal produced from the part of the transmitter shown in FIG. 1a or FIG. 3.

In FIG. 1, a writing table 11 includes an array of X wires disposed in parallel and at fixed intervals and Y wires disposed in a similar manner, but orthogonally to the X wires. Those X and Y wires form a matrix electrode 20. Insulating and cushion members are layered on the matrix electrode 20. For writing something, a record paper is placed on the insulating cushion member layer and then something is written on the record paper with a pen 1.

The respective X wires are supplied with voltages having the same frequency q, but with fixed phase differences. Similarly, the respective Y wires are also supplied voltages having the same frequency r, but also with fixed different phases. The tip of the transmission pen 1 functions not only in the manner of the usual pen point supplied with ink for writing, but also as an antenna. When the point of the pen 1 is in contact with the record paper on the table, an electrical field is developed at a position on the X and Y coordinates on the table, which induces a voltage into the pen point.

The induced voltage is a function of the frequencies q and r and phases $\theta(X)$ and $\phi(Y)$, which are dependent on the X and Y coordinates. The induced voltage V is amplified by an amplifier 2 for any given pen-point position frequency of the X signal component passes through a band-pass filter 6 to reach a channel X phase locked loop circuit 7. The phase locked loop compares the phase of the input signal with the phase of a reference signal, in order to produce a signal having a frequency which is deviated in accordance with the phase difference, as described in the U.S. Pat. No. 3,767,858, for example.

A frequency q' signal produced from the channel X phase locked loop circuit 7 is applied to phase shifters 8a, 8b and 8c, which in turn produce signals with +90°, 0° and −90° shifts. Phase shifters 8a, 8b and 8c are connected to the X wires through conductors 10a, 10b and 10c.

The frequency of the Y signal component similarly passes through a band-pass filter 3 to reach a channel Y phase locked loop circuit 4, where it is compared with the phase of a reference signal. The channel Y phase locked loop circuit 4 produces a frequency signal r' with a frequency deviated in accordance with the detected phase difference. The output signal from the phase locked loop 4 is applied to phase shifters 5a, 5b and 5c which in turn produce signals with the shifted phases +90°, 0° and −90°. Those phase shifted signals are applied to the Y wires, through conductors 9a, 9b and 9c. The signal voltages applied to the matrix electrode 20 through the conductors 9a to 9c are divided by resistors 11a-1 to 11a-n; the signal voltage applied to the matrix through the conductors 10a to 10c are divided by resistors 11b-1 to 11b-n. Through the voltage dividing, the phase of the signals are equally divided on the X and Y wires.

Figure 2:
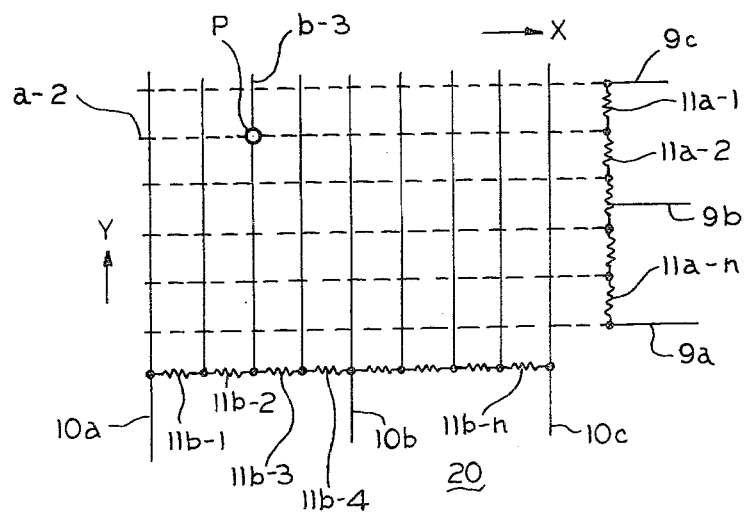
FIG. 2 is a detailed circuit diagram of a matrix electrode of a wiring table.

When the pen point of the pen 1 is positioned at a position P on the coordinates in FIG. 2, an X signal with frequency q and the phase appearing on a wire b-3 and a Y signal with a frequency r and the phase appearing on a wire a-2, are induced in the output terminal of the pen 1 via an electrostatic coupling. As described above, the induced voltage is applied through the amplifier 2 to the band-pass filter 3 and 6 where the X- and Y-component frequencies are extracted. The X- and Y-component frequencies are applied to the X- and Y-phase locked loops 7 and 4, respectively, where they are converted into signals with frequencies proportional to the X-distance coordinate and Y-distance coordinate. Those converted signals are derived from the output terminals 12 and 13, respectively. Generally, the Y-component frequency of the phase locked loop 4 is 7 KHz±1 KHz and the X-component frequency of the phase locked loop 7 is 1400 Hz±200 Hz. Those X- and Y-component frequencies are quartered at the frequency dividers 21 and 22, shown in FIG. 1b, respectively. Then, a modulator 23 amplitude-modulates the Y signal as a carrier signal with the X signal. The modulated signal is amplified by an amplifier 24 and then is transmitted through a telephone line to a receiver which includes a counterpart of the telewriter communication system.

The conventional telewriter uses a range of 1 to 8 KHz for the frequency of the signal applied to the matrix electrode 20 on the writing table. For this reason, the coupling impedance between the writing table and the pen point is large, resulting in a large coupling loss. The insulating member, the cushion member, and the record paper, which are layered on the matrix electrode, often contain moisture, which changes the local conductivity of the matrix. The change in conductivity brings about a change in coupling impedance. This frequently makes it difficult to accurately read the X and Y positional information, or the coordinates information.

Figure 3:
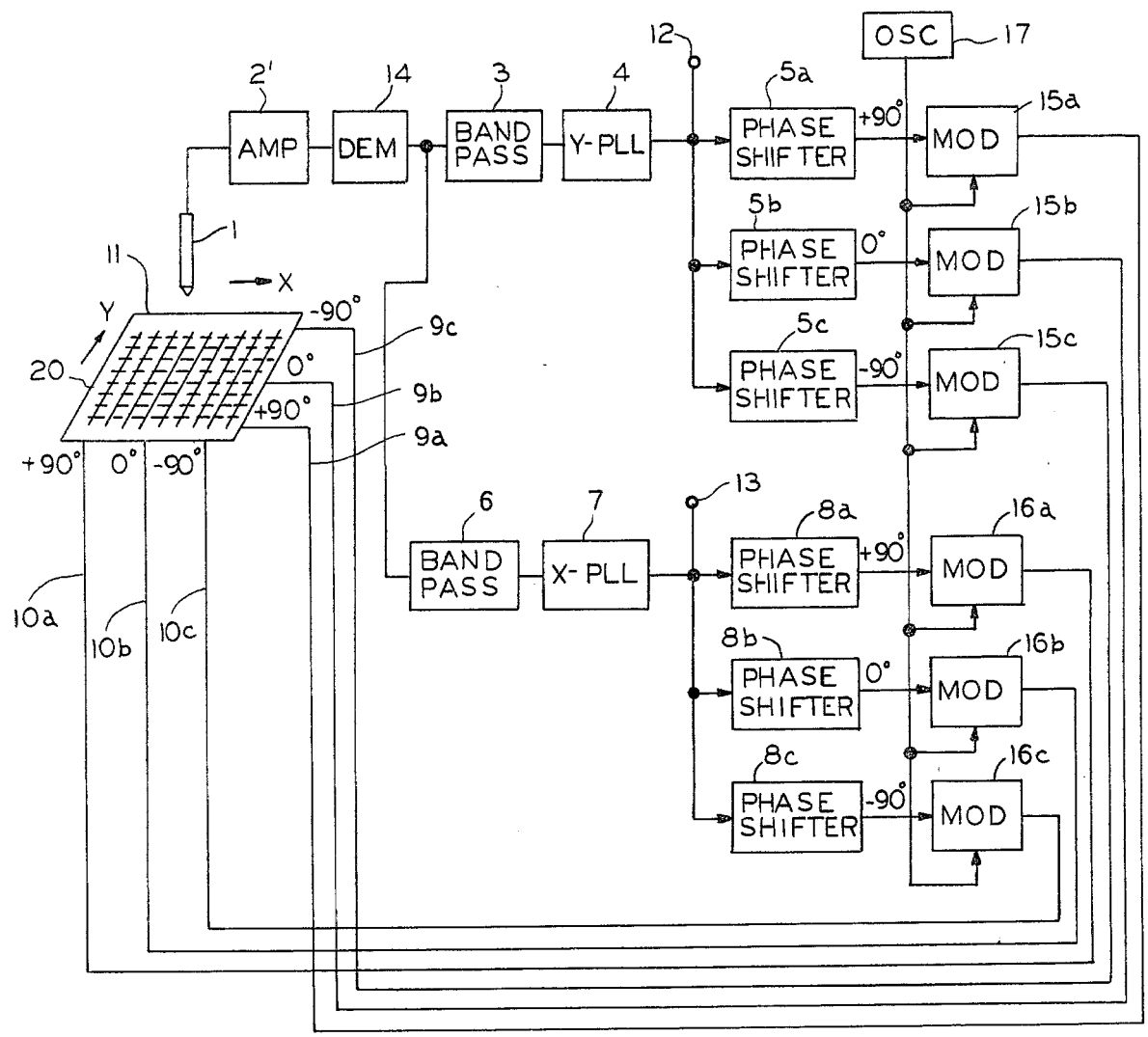
FIG. 3 is a block diagram of a transmitter for a telewriter constructed according to the invention.

An embodiment of the transmitter according to the invention is shown in FIG. 3. In addition to the circuits of the transmitter shown in FIG. 1, the embodiment in FIG. 3 includes an oscillator 17, AM modulators 15a, 15b, 15c, 16a, 16b and 16c, and a demodulator 14. Also, amplifier 2' is a high frequency amplifier. The structural elements in FIG. 3 are the same as those of FIG. 1. Therefore, no further description thereof will be given here.

Amplitude-modulated signals from AM modulators 15,16 are applied to the X and Y wires, which constitute a matrix electrode on the writing table 11. Modulating signals from the respective phase shifters 5,8 amplitude-modulate the output of the oscillator 17. The output signal of the AM modulator is a high frequency signal with a center frequency of 50 KHz as the carrier signal. Accordingly, voltages induced in the point of the pen 1 have a frequency near 50 KHz, and phase information which corresponds to the coordinates of the X and Y pen-point. The induced voltage is amplified by the high-frequency amplifier 2' and then is demodulated by the demodulator 14. The demodulated signal is applied to the band-pass filters 3 and 6. The output signal from the demodulator 14 has the same frequency and phase as those of the amplifier 2 in FIG. 1.

To describe those relationships more clearly, reference is made to FIG. 2. First, consider the X signal of the conventional apparatus in FIG. 1. The output voltages $e_b$ and $e_a$ from the phase shifters 8b and 8a (FIG. 1) are given as follows:

$$e_b = \cos qt \tag{1}$$

$$e_a = \cos(qt + \phi) \tag{2}$$

The voltages $e_b$ and $e_a$ are applied to conductors 10b and 10a. Since the resistances of the resistors 11b-1 to 11b-4 are equal, the voltage $e_x$ on the X wire b-3 may be expressed as follows:

$$e_x = \tfrac{1}{2}(e_b + e_a) = \cos\frac{\phi}{2} \cos\left(qt + \frac{\phi}{2}\right) \tag{3}$$

The output signals from the phase shifters 8b and 8a in FIG. 3 are the same as the voltages $e_b$ and $e_a$ obtained by equations (1) and (2). However, the carrier frequency $\omega$ derived from the oscillator 17 is modulated by the AM modulators 16b and 16a. Thus, voltages $e_b'$ and $e_a'$ applied to the conductors 10b and 10a may be expressed by the following equations (4) and (5):

$$e_b' = (1 + m \cos qt) \cos \omega t \tag{4}$$

$$e_a' = \{1 + m \cos(qt + \phi)\} \cos \omega t \tag{5}$$

where m is a modulation index. Accordingly, the voltage $e_x'$ on the X wire b-3 (FIG. 2) is expressed as follows:

$$e_x' = \tfrac{1}{2}(e_b' + e_a') = \left\{1 + m \cdot \cos\frac{\phi}{2} \cdot \cos(qt + \tfrac{1}{2}\phi)\right\} \cos \omega t \tag{6}$$

$$= (1 + m \cdot e_x) \cos \omega t.$$

The voltage $e_x'$ is equal to that obtained when the carrier frequency is amplitude-modulated by the voltage $e_x$ of equation (3). Therefore, by demodulating the voltage $e_x'$ with the demodulator 14, the output of the demodulator is proportional to $e_x$. As a consequence, the input signals to the band-pass filters 3 and 6 are the same in both FIGS. 1 and 3. The above explanation is also applicable for the Y signal.

The demodulator 14 (FIG. 3) may be a conventional AM demodulator including a detector which has a diode, or the like, and a low-pass filter for eliminating the carrier component. The output of the demodulator 14 (FIG. 3) is processed in the same manner as the output of the amplifier 2 of FIG. 1. In brief, the phase information is converted into the corresponding frequency information by the phase locked loops 4 and 7. The frequency information is frequency-divided by the frequency dividers shown in FIG. 1b. Then, the Y-signal frequency is amplitude-modulated by the X signal frequency, and the modulated signal is transmitted through the amplifier 24 and the telephone line to the counterpart of the communication system.

The electrostatic coupling impedance between each electrode wire and the pen point is inversely proportional to frequency at the corresponding point. In the present invention, the high frequency signal is modulated by a signal with a much lower frequency than that of the carrier signal applied to the matrix electrode 20, so that the coupling impedance is small. As a result, coupling loss is reduced and a large voltage is induced in the pen point.

Because of the reduction of the coupling impedance, the coupling is concentrated between the pen point and the wires disposed under the pen point, even if moisture locally changes the conductivity of the record paper or the like. As a result, the adverse effect of moisture is negligible, even for a humidity as high as 95 percent.

As seen from the foregoing explanation, the connection of the modulator and the demodulator with the input and output terminals of the writing table, respectively, is sufficient to provide a transmitter according to this invention. Therefore, the conventional telewriter may be used without requiring complete design change. With some minor modifications, a high accuracy of reading X and Y positions may be ensured.

The three phase shifters used for each of the X and Y phase locked loops for the purpose of phase adjusting in the above-mentioned embodiments may be replaced by two phase shifters, as disclosed in U.S. Pat. No. 3,767,858.

The resistor circuit used as a phase dividing circuit among the X and Y wires may, of course, be replaced by a capacitance circuit or a capacitance/resistor combination circuit, as referred to in U.S. Pat. No. 3,865,977.

What is claimed is:

1. A telewriter transmitter comprising:
    a supporting plate;
    a wire assembly having a first array of parellel wires arranged on said plate in an X-axis direction and a second array of parallel wires arranged on said plate in a Y-axis direction perpendicular to the X-axis direction, said arrays defining X and Y coordinates on said plate;
    transmission pen means having a point for electrostatically picking up X-axis and Y-axis signals responsive to signals in said first and second arrays, respectively, said X-axis and Y-axis signals having phases uniquely representative of the coordinates closest to the point of the pen;
    means for translating said X-axis and Y-axis signals into signals having predetermined frequency deviations relative to the phases of said X-axis and Y-axis signals picked up by said pen means;
    means responsive to said translated X-axis and Y-axis frequency signals for providing at least X-axis and Y-axis phase shift signals having phases lying in a preset relationship with said X-axis and Y-axis frequency signals; and
    means for equally phase-splitting said X-axis and Y-axis phase shift signals and for distributing them to said wire assembly, carrier wave source means having a frequency which is considerably higher than said X-axis and Y-axis frequency signals; means for amplitude modulating said carrier wave with the outputs of said phase-shifting means; and means for demodulating a signal picked up by said pen.

2. A telewriting transmitter comprising a supporting plate means having a matrix of electrodes defining X and Y coordinates with electrostatic coupling at crosspoints of said matrix, means for selectively energizing said electrodes with a high-frequency carrier signal to identify said coordinates in said matrix by different phase angles of said carrier signal, movable pickup means for detecting the different phase angles at any selected crosspoint in order to define a path followed by said pickup means as it traverses said supporting plates, means responsive to said detected phase angle for amplitude modulating said carrier frequency, means for feeding back said amplitude modulated signal to further enhance the selective energization of said electrodes, whereby said pickup means picks up said amplitude modulated signal, and means for demodulating said picked up signal to extract the coordinate identifying phase angle signal therefrom.

3. The telewriter transmitter of claim 2 and means for dividing the demodulated signal in order to produce separate X and Y matrix crosspoint coordinate identifying signals corresponding to existing telewriter system standard signals, whereby the high level of said amplitude modulated high-frequency carrier signals may be used as matrix crosspoint identifying signals without requiring a redesign of associated telewriter system equipment.

4. The telewriter transmitter of either claim 2 or claim 3 and filter means coupled to the output of said pickup means for separating X and Y coordinate identifying signals, means for feeding the separated X coordinate identifying signals through a first phase-locked loop circuit to phase shifter means which produce said different phase angles for X-axis coordinate identification, means for feeding the separated Y coordinate identifying signals through a second phase-locked loop circuit to phase shifter means which produce said different phase angles for Y-axis coordinate identification, and means for applying said different phase angles to said amplitude modulating means.

5. A method for improving the signal-to-noise ratio of a telewriter transmitter without requiring a change in preexisting telewriter transmission equipment, said method comprising the steps of:
    a. defining crosspoints of an orthogonal matrix of wires by high-frequency X and Y signals having phase-shifted characteristics which identify individual crosspoints by phase angles;
    b. picking up said high-frequency signals by an electrostatic coupling between a pickup means and any selected crosspoint;
    c. amplitude modulating the picked-up signal to increase the strength of the picked-up signal;
    d. feeding back the amplitude modulated signal to the identified crosspoints, thereby enhancing the strength of the picked-up signal; and e. demodulating the enhanced picked-up signal to recover the original phase-shifted characteristics which individually identified a selected crosspoint.

6. The method of claim 5 and the added step of converting the demodulated signals into the form used by said preexisting telewriter transmission system.

7. The method of claim 6 wherein said converted signals are the demodulated signals which have been divided in the conversion step.

* * * * *

UNITED STATES PATENT AND TRADEMARK OFFICE
CERTIFICATE OF CORRECTION

PATENT NO. : 4,289,926
DATED : September 15, 1981
INVENTOR(S) : MASAHISA KOBAYASHI It is certified that error appears in the above—identified patent and that said Letters Patent is hereby corrected as shown below:

Col. 2, Line 56, after "coordinates" insert --for any given pen point position--;

Col. 2, Lines 57-58, after "2", delete "for any given pen point position"; after "2", "frequency" should be --. The frequency--;

Col. 3, Line 1, after "-90°" insert --phase--;

Col. 3, Line 29, after "6" insert --,--;

Col. 4, Line 13, after "pen-point" insert --position--;

Col. 5, Line 24, after "disposed" insert --directly--.

Signed and Sealed this

Eighth Day of December 1981

[SEAL]

Attest:

GERALD J. MOSSINGHOFF

Attesting Officer   Commissioner of Patents and Trademarks